(12) United States Patent
Hur

(10) Patent No.: US 6,401,887 B1
(45) Date of Patent: Jun. 11, 2002

(54) SHOCK ABSORBER

(75) Inventor: Kwang Yong Hur, Seoul (KR)

(73) Assignee: Impact Black Hole Co., Ltd., Seoul (KR)

( * ) Notice: Subject to any disclaimer, the term of this patent is extended or adjusted under 35 U.S.C. 154(b) by 0 days.

(21) Appl. No.: 09/509,109

(22) PCT Filed: Sep. 21, 1998

(86) PCT No.: PCT/KR98/00288

§ 371 (c)(1),
(2), (4) Date: May 30, 2000

(87) PCT Pub. No.: WO99/15807

PCT Pub. Date: Apr. 1, 1999

(30) Foreign Application Priority Data

Sep. 24, 1997 (KR) .............................................. 97-48483

(51) Int. Cl.[7] .................................................. F16F 7/12
(52) U.S. Cl. ........................ 188/376; 267/136; 293/133
(58) Field of Search ................................ 267/136, 166, 267/173, 174, 139, 33, 66, 67, 68; 188/371, 376, 377; 293/133; 74/521

(56) References Cited

U.S. PATENT DOCUMENTS

| | | | | |
|---|---|---|---|---|
| 3,819,218 A | * | 6/1974 | Liu ............................. | 188/371 |
| 3,972,390 A | * | 8/1976 | Melton et al. ............... | 188/377 |
| 5,248,129 A | * | 9/1993 | Gertz .......................... | 293/133 |
| 5,403,113 A | * | 4/1995 | Gertz et al. ................. | 188/374 |
| 5,464,177 A | * | 11/1995 | Kramer et al. .............. | 267/279 |
| 5,642,792 A | * | 7/1997 | June .......................... | 188/377 |
| 6,203,079 B1 | * | 3/2001 | Breed ......................... | 188/377 |

\* cited by examiner

Primary Examiner—Paul N. Dickson
Assistant Examiner—Mariano Sy
(74) Attorney, Agent, or Firm—Greer, Burns & Crain, Ltd.

(57) ABSTRACT

A shock absorber is disclosed. In the shock absorber, a unit cross member consists of two longitudinal arms. The two arms cross each other and are hinged to each other at the cross, thus being selectively closed by impact. One or more wires are vertically connected to the two crossing arms. Two guide panels are vertically positioned on opposite sides of the cross member and movably engage with associated arm ends of the cross member. In another embodiment, a plurality of cross members are coupled to each other in at least one of X, Y and Z-axes, thus forming a scissor assembly. The above shock absorber effectively absorbs impact or kinetic energy using the rupture stress of wires while changing the direction of impact force into a vertical direction and securing an effective displacement.

7 Claims, 4 Drawing Sheets

SHOCK ABSORBER

TECHNICAL FIELD

The present invention relates, in general, to a shock absorber and, more particularly, to a shock absorber capable of effectively absorbing impact or kinetic energy using the rupture stress of a wire while changing the transmitting direction of impact force from a horizontal direction into a vertical direction and securing an effective displacement suitable for reducing the impact of inertia when being impacted.

BACKGROUND ART

As well known to those skilled in the art, shock absorbers have been effectively used in a variety of industrial fields. That is, such shock absorbers are effectively used as a cushioning device for automobiles, trains, piers, emergency landing strips of airports, elevator pits, large-scaled and specially equipped trucks or construction vehicles. Such shock absorbers are also used as a cushioning device in safety facilities for traffic applications such as median strips, guard rails, and protection walls of terminuses of streets or railroads. Other applications of the above shock absorbers are in protection mats for persons falling from low-story buildings that are on fire, military bunkers, or buffers for reducing or eliminating external impact energy in various industrial fields.

In the prior art, waste tires or plastic structures have been typically used as shock absorbers. Such tires and plastic structures, used as shock absorbers, are crushed in an impacting direction when being impacted, thus effectively absorbing the impact or kinetic energy and retarding the time of transmission of impact energy.

On the other hand, the chassis for automobiles has been designed to be crushed, thus absorbing the impact of inertia and protecting passengers from such impact when it is impacted.

Examples of typical shock absorbers are air bags, gas shock absorbers, springs, high viscosity materials or styrofoam.

Typical air bags are known as ideal shock absorbers since they individually and uniformly distribute impact energy on the external surface of a spherical air body. However, such air bags are problematic in that they are expensive and are difficult to install. The typical gas shock absorbers are designed in that when the gas shock absorbers are impacted, they are compressed while increasing the gas pressure in their cylinders and absorbing impact or kinetic energy. However, such gas shock absorbers are problematic in that the impacting energy direction is maintained without being changed. Typical springs are designed for absorbing impact or kinetic energy due to their resiliency when being impacted. However, the springs also cause a reaction and this sometimes causes secondary problems due to reaction force resulting in bouncing.

Other typical shock absorbers are not designed for changing or dividing the direction of impact energy, thus failing to effectively absorb such an impact or kinetic energy. Another problem experienced in the typical shock absorbers resides in that they are not designed to secure effective displacement, thus regrettably resulting in severe damage of impacting and impacted materials. When such shock absorbers, failing to secure an effective displacement, are used with automobiles, the shock absorbers cannot effectively protect passengers, but result in severe injury of them when the automobiles are impacted.

DISCLOSURE OF THE INVENTION

Accordingly, the present invention has been made keeping in mind the above problems occurring in the prior art, and an object of the present invention is to provide a shock absorber, which effectively absorbs impact or kinetic energy while eliminating the problems caused by reaction force, changing the transmitting direction of impact force from a horizontal direction into a vertical direction, and securing an effective displacement suitable for reducing the impact of inertia when being impacted, and which is also produced at low cost and is easily installed.

In order to accomplish the above object, a shock absorber according to the primary embodiment of this invention comprises: a unit cross member including: two longitudinal arms crossing each other and hinged to each other at a cross, thus being selectively closed by impact; and at least one wire vertically connected to the two crossing arms; and two guide panels vertically positioned on opposite sides of the cross member, wherein the guide panels individually have a vertical guide groove on their inside surfaces, thus movably receiving associated ends of the arms. When an impact or kinetic energy is applied to either guide panel of this embodiment, the unit cross member along with the wire effectively absorbs the kinetic energy while securing an effective displacement suitable for reducing the impact of inertia.

In another embodiment, the shock absorber comprises: a plurality of unit cross members coupled to each other at their ends in X, Y and Z-axes, thus forming a multi-scissor assembly, each of the cross members including: two longitudinal arms crossing each other and hinged to each other at a cross, thus being selectively closed by impact; and at least one wire vertically connected to the two crossing arms; and two guide panels vertically positioned on opposite sides of the multi-scissor assembly, the guide panels individually having a plurality of vertical guide grooves on their inside surfaces, thus movably receiving associated ends of the multi-scissor assembly. When an impact or kinetic energy is applied to either guide panel of this embodiment, the unit cross member along with the wire effectively absorbs the kinetic energy while changing the transmitting direction of impact force from a horizontal direction into a vertical direction by the wire and securing an effective displacement, suitable for reducing the impact of inertia, until the wire is ruptured.

In a further embodiment, the shock absorber comprises: a horizontal rail member; an arm vertically passing across and hinged to the rail member, with top and bottom sections of the arm respectively extending upwardly and downwardly; and a plurality of wires connected to both the rail member and the top section of the arm. When an impact or kinetic energy is applied to the arm, the arm along with the wires effectively absorbs the kinetic energy.

In a brief description, when the shock absorber of this invention is impacted, it changes the transmitting direction of the impact force from a horizontal direction into a vertical direction. Due to the impact force acting in the vertical direction, the wires are expanded and finally ruptured, thus securing an effective displacement between the impact application point to the impact transmission point. The shock absorber also minimizes the reaction force acting on the impacting material, thus reducing the damage of the impacting and impacted materials. The shock absorber thus effectively protects passengers when it is used with an automobile.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
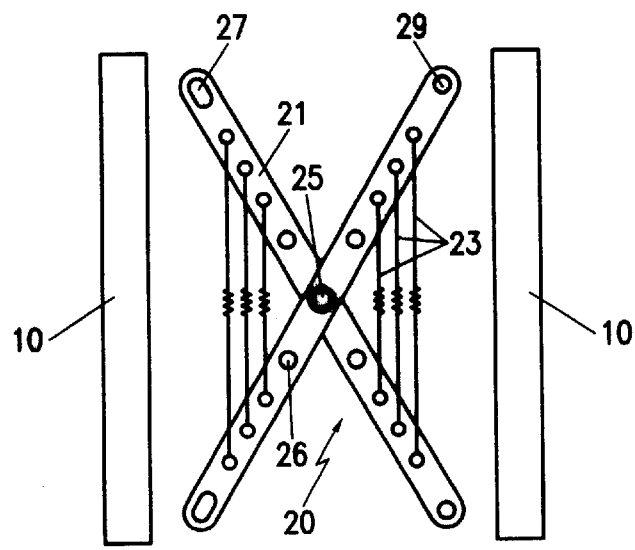
FIG. 1 is a front view showing a shock absorber provided with one unit cross member in accordance with the primary embodiment of the present invention.

FIG. 1 is a front view showing a shock absorber provided with one unit cross member in accordance with the primary embodiment of the present invention. As shown in the drawing, the unit cross member 20 comprises two longitudinal arms 21 which individually have a plurality of several types of holes 25, 26, 27 and 29 at predetermined positions. The two arms 21 cross each other at their centers provided with the center holes 25 are hinged to each other at the cross through a bolting or riveting process. A plurality of tension wires 23 are vertically connected to the two arms 21 with both ends of each wire 23 being connected to opposite of the two arms 21, thus tensioning the two crossing arms 21. Two guide panels 10 are vertically positioned on opposite sides of the unit cross member 20. The above guide panels 10 individually have a vertical guide groove on their inside surfaces, thus movably receiving associated ends of the arms 21. The guide panels 10 are coupled to each other at their top and bottom edges using elastic members or wires (not shown), so that they are prevented from an unexpected separation.

In the present invention, the cross member 20 may have a symmetric or asymmetric structure around the cross. The tension wires 23 are vertically positioned at opposite sides of the cross while forming a symmetric or asymmetric structure of the unit cross member 20.

In addition, the wires 23 may comprise several types of wires, having different lengths, materials, thicknesses and expansion coefficients.

Figure 2:
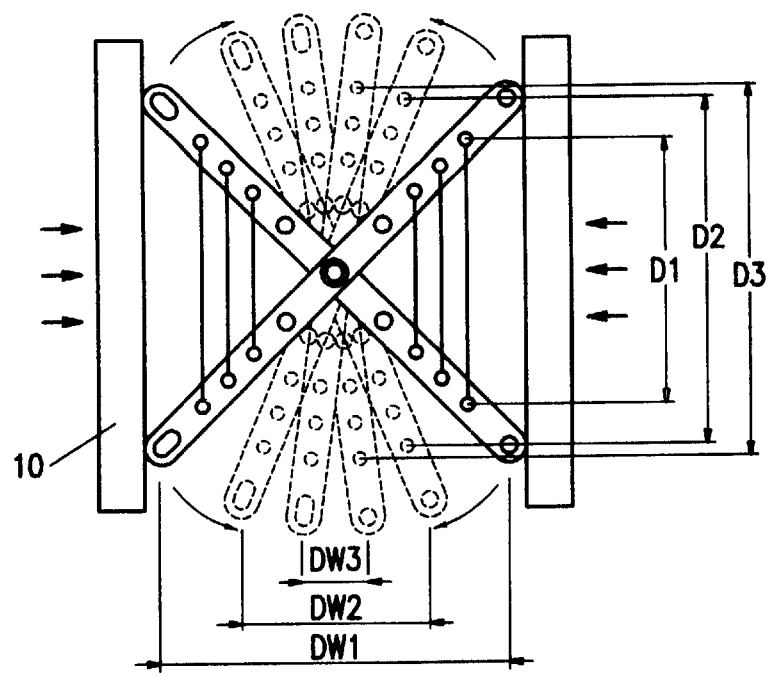
FIG. 2 is a front view showing the operational effect of the shock absorber of FIG. 1.

FIG. 2 is a front view showing the operational effect of the shock absorber of FIG. 1. As shown in the drawing, when an impact or kinetic energy is applied to the guide panels 10 in inward directions as shown by the arrows of the drawing, the guide panels 10 are pushed inwardly. Therefore, the unit cross member 20 is closed with the ends of the unit cross member 20 being moved upwardly and downwardly along the guide grooves of the panels 10. In such a case, the tension wires 23 are expanded. When the impact energy, applied to the two panels 10, is higher than the rupture stress of the wires 23, the wires 23 are continuously ruptured until the unit cross member 20 is fully closed. Therefore, the unit cross member 20 effectively absorbs the impact or kinetic energy while securing an effective displacement between the two guide panels 10.

In a detailed description, when the unit cross member 20 is closed by the impact energy applied to the panels 10, the wire 23 is gradually expanded from D1 to D2 and D3, while the width between the ends of the cross member 20 is reduced from DW1 to DW2 and DW3. Therefore, the width between the ends of the unit cross member 20 is reduced by DW1–DW3. In such a case, the width reduction DW1–DW3 reaches about 90% of the original width DW1 so that the shock absorber of this invention secures an effective displacement and effectively absorbs the impact energy while reducing the damage of the impacting material.

When the shock absorber is provided with a plurality of tension wires 23, the wires 23 are continuously and orderly ruptured while primarily and repeatedly absorbing the impact or kinetic energy. In addition, since the width between the top ends of the unit cross member 20 is reduced by DW1–DW3, the shock absorber secondarily absorbs the impact energy while retarding the time of transmission of impact energy. The shock absorber thus effectively reduces the impact of inertia.

In the present invention, it is possible to fix either of the two guide panels 10 while allowing the other panel to be movable.

Figure 3:
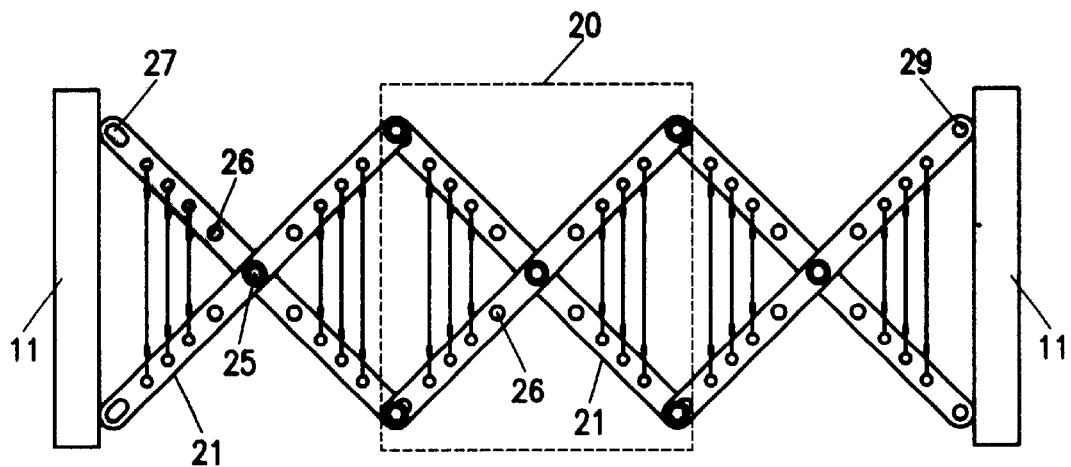
FIG. 3 is a perspective view showing a shock absorber provided with a plurality of unit cross members coupled to each other in an X-axis in accordance with the second embodiment of the present invention.

FIG. 3 is a perspective view showing a shock absorber provided with a plurality of unit cross members coupled to each other in an X-axis in accordance with the second embodiment of the present invention. As shown in the drawing, the shock absorber of the second embodiment comprises a plurality of unit cross members 20 which are coupled to each other in an X-axis, thus forming a scissor assembly. The above unit cross members 20 individually have the same construction as that described for the primary embodiment. That is, each of the cross members 20 comprises two longitudinal arms 21. The two arms 21, individually having a plurality of several types of holes 25, 26, 27 and 29 at predetermined positions, cross each other at their centers provided with the center holes 25 and are hinged to each other at the cross. A plurality of tension wires 23 are vertically connected to the two arms 21, thus tensioning the two crossing arms 21. Two guide panels 11 are vertically positioned on opposite sides of the scissor assembly. The above guide panels 11 individually have a vertical guide groove on their inside surfaces, thus movably receiving associated ends of the crossing arms 21.

In order to couple the cross members 20 to each other into such a scissor assembly, the ends of the arms 21 are provided with holes 27 and 29 for being hinged to each other through a bolting or riveting process. In this embodiment, the holes 27 preferably have an elliptical configuration suitable for allowing the cross members 20 to be differentially operated to more effectively absorb impact energy when the cross members 20 are closed by the impact energy.

Figure 4:
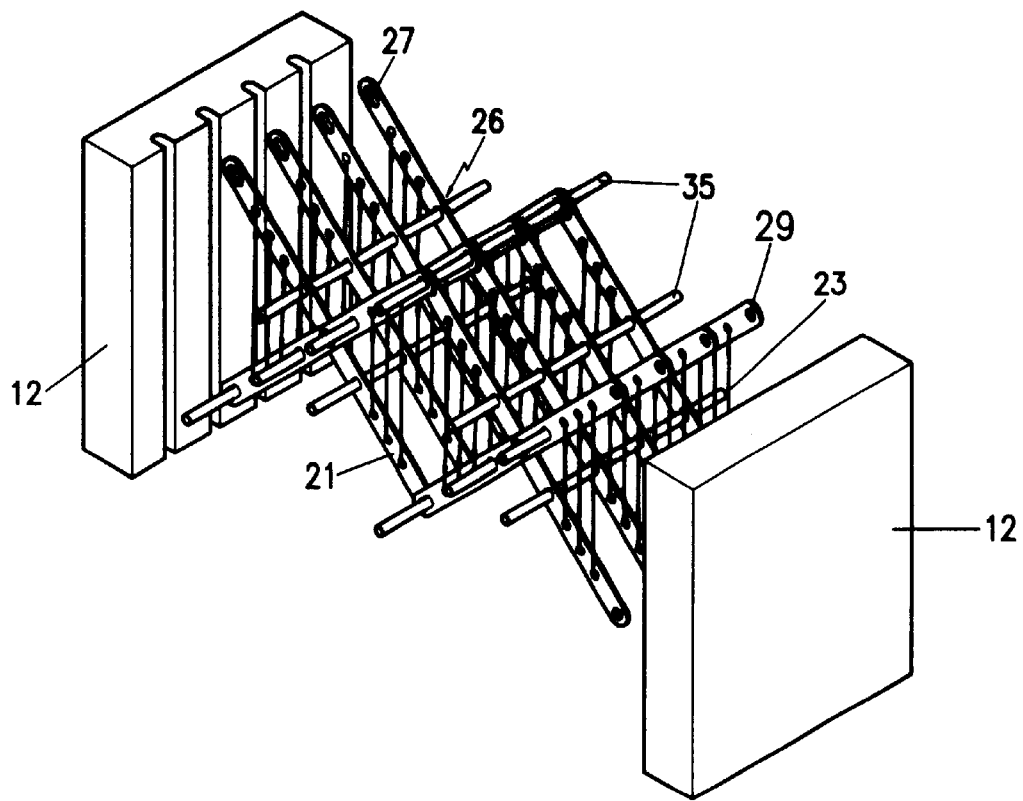
FIG. 4 is a front view showing a shock absorber provided with a plurality of unit cross members coupled to each other in X and Z-axes in accordance with the third embodiment of the present invention.

FIG. 4 is a front view showing a shock absorber provided with a plurality of unit cross members coupled to each other in X and Y-axes in accordance with the third embodiment of this invention. In the third embodiment, a plurality of unit cross members 20 are coupled to each other in an X-axis in the same manner as described for the second embodiment, thus forming a scissor assembly. Thereafter, a plurality of scissor assemblies are coupled to each other in a Y-axis using a plurality of longitudinal connection bars 35 to go through the holes 26, 27, and 29 in the arms 21, thus forming a multi-scissor assembly. In such a case, the scissor assemblies are arranged in the Y-axis while being spaced out at regular intervals. Two guide panels 12 are vertically positioned on opposite sides of the multi-scissor assembly. The above guide panels 12 individually have a plurality of vertical guide grooves on their inside surfaces, thus movably receiving associated ends of the crossing arms 21 of the multi-scissor assembly.

In the third embodiment, the crossing arms 21 of the cross members 20 are hinged to each other at their crossing centers through a bolting or riveting process. However, it should be understood that the above crossing arms 21 may be hinged to each other at their crossing centers using a plurality of longitudinal connection bars which have the same configuration as the connection bars 35. In such a case, it is possible to remove some connection bars 35 from the multi-scissor assembly while leaving the connection bars 35 passing through the crossing centers of the arms 21.

Figure 5:
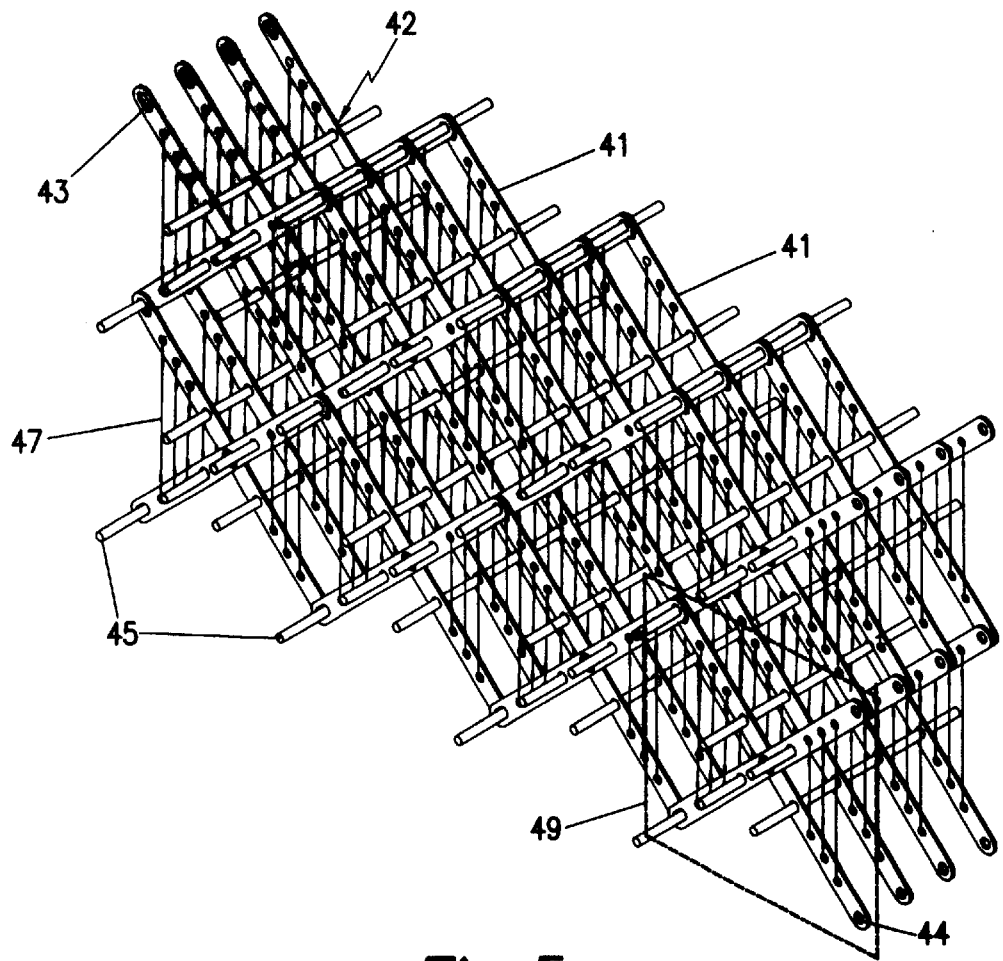
FIG. 5 is a perspective view showing a shock absorber provided with a plurality of unit cross members coupled to each other in X, Y and Z-axes in accordance with the fourth embodiment of the present invention.

FIG. 5 is a perspective view showing a shock absorber provided with a plurality of unit cross members coupled to each other in X, Y and Z-axes in accordance with the fourth embodiment of this invention. In the fourth embodiment, two arms 41, individually having a plurality of holes 42, 43 and 44 at their crossing points and ends, cross each other prior to being hinged at the cross through a bolting or riveting process, thus forming a cross member 49. A plurality of cross members 20 are coupled to each other in X and Z-axes using a plurality of longitudinal connection bar 45 in the similar manner as described for the third embodiment, thus forming a multi-scissor assembly. Thereafter, two or more multi-scissor assemblies are coupled to each other in a Y-axis using a plurality of the longitudinal connection bar 45 to go through the holes 42, 43 and 44, thus forming a multi-layered, multi-scissor assembly. Thereafter, a plurality of tension wires 47 are vertically connected to the crossing arms 41, thus tensioning the arms 41. Two guide panels (not shown) are vertically positioned on opposite sides of the assembly. The above guide panels individually have a plurality of vertical guide grooves on their inside surfaces, thus movably receiving associated ends of the crossing arms 41 of the assembly.

In the fourth embodiment, the length of some arms 41, is longer than the arm 21 of the primary to second embodiments. That is, the arms 41, which extend in the same direction in the multi-scissor assembly, are not separated from each other, but are integrated into a single structure. The operational effect of the assembly using such a lengthened arm 41 remains the same as that described for the embodiments using the short arms 21 and further explanation is thus not deemed necessary. Another advantage of the lengthened arms 41 resides in that the multi-layered, multi-scissor assembly can be easily produced.

In this embodiment, the crossing arms 41 of the unit cross members 20 are hinged to each other at their crossing points through a bolting or riveting process. However, it should be understood that the above crossing arms 41 may be hinged to each other at their crossing points using a plurality of longitudinal connection bars which have the same configuration as the connection bars 45. In such a case, it is possible to remove some connection bars 45 from the multi-scissor assembly while leaving the connection bars 45 passing through the crossing points of the arms 41.

In the present invention, the tension wires 23 and 47 may be provided with an elastic means or a bent part capable of allowing the wires to be ruptured with a time difference or retarding the time of rupture of the wires. In such a case, the wires 23 and 47 are ruptured at multi-stages, thus more effectively absorbing impact energy. The above wires 23 and 47 may be preferably made of a metal, synthetic resin, stainless steel or fiber. It is more preferable to use stainless steel wires.

On the other hand, the arms 21 and 41 may have a linear or curved configuration. That is, a straight or S-shaped bar may be used as such on arms 21, 41 without affecting the functioning of this invention. In the preferred embodiment of this invention, the arms 21 and 41 are individually holed at several points so as to hold the wires 23 and 47. However, it should be understood that the arms 21 and 41 may be provided with wire holding grooves or projections (not shown), capable of firmly holding the wires, in place of such holes without affecting the functioning of this invention.

When the wires are held on the arms 21 and 41 provided with the wire holding grooves or projections as described above, the wires are mainly tensioned at their middle portions when the wires are expanded by the kinetic energy. Therefore, the wires may be not ruptured at their ends, but cut at the middle portions when being expanded.

Figure 6:
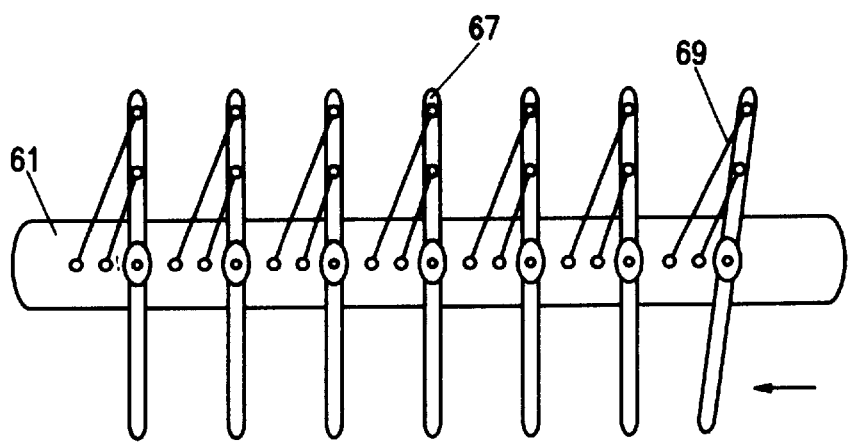
FIG. 6 is a front view showing a guard rail provided with a shock absorber in accordance with the fifth embodiment of this invention.

FIG. 6 is a front view showing a guard rail provided with a shock absorber in accordance with the fifth embodiment of this invention. In this embodiment, a plurality of arms 67 regularly and vertically pass across a horizontal guard rail 61 prior to being hinged to the guard rail 61 through a bolting or riveting process. In addition, a plurality of tension wires 69 are connected to both the guard rail 61 and the top section of each arm 67 at their both ends.

When the arms 67 are impacted in a direction as shown by the arrow of FIG. 6, the wires 69 are expanded or ruptured to effectively absorb impact or kinetic energy, thus reducing the plastic deformation of the impacting material or an automobile colliding on the arms 67.

In this embodiment, it is preferable to provide a shock absorbing material at the lower section of each arm 67.

In addition, the wires 69 may preferably comprise several types of wires, having different lengths, materials, thicknesses and expansion coefficients. When an impacting action is quickly ended in a way such that the reaction force is not transmitted to the impacting material, it is more preferable to use a spring or a rubber strip as each of the wires 69. In such a case, the spring or the rubber strip has a high resiliency, so that it is possible to use the wires 69 almost semi-permanently when the kinetic energy, applied to the wires 69, is not higher than a predetermined level.

Figure 7:
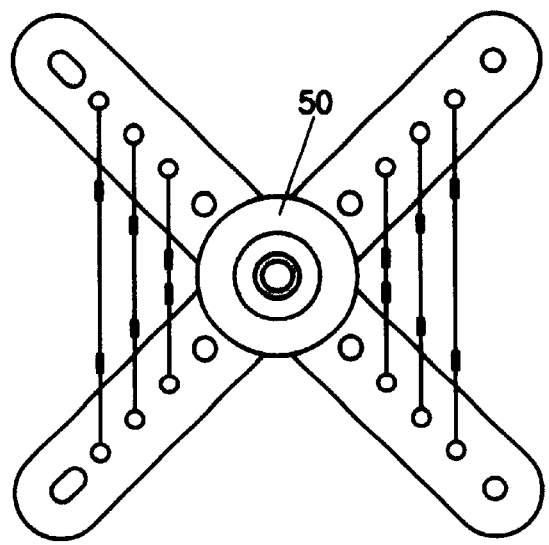
FIG. 7 is a front view showing a unit cross member provided with an additional shock absorbing means at its hinged cross in accordance with the sixth embodiment of the present invention, the additional shock absorbing means being used for secondarily absorbing impact or kinetic energy when the two crossing arms of the cross member are closed by the impact.

FIG. 7 shows a unit cross member in accordance with the sixth embodiment of the present invention. In this embodiment, the hinged cross of the unit cross member is covered with a circular cap 50 filled with a shock absorbing material. The above cap 50 secondarily absorbs impact or kinetic energy due to its shearing force when the two crossing arms of the cross member are closed by impact.

Figure 8:
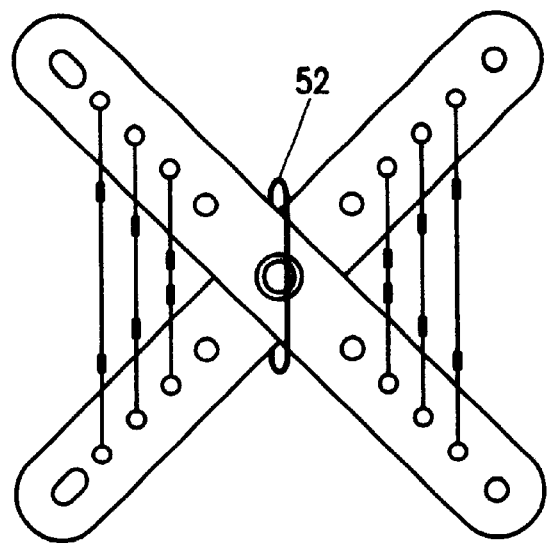
FIG. 8 is a front view showing a unit cross member provided with a shock absorbing wire at its hinged cross in accordance with the seventh embodiment of the present invention, the wire being used for secondarily absorbing impact or kinetic energy when the two crossing arms of the cross member are closed by the impact.

FIG. 8 shows a unit cross member provided with a shock absorbing wire 52 at its hinged cross in accordance with the seventh embodiment of this invention. The above wire 52 is used for secondarily absorbing impact or kinetic energy due to its shearing force when the two crossing arms of the cross member are closed by impact.

INDUSTRIAL APPLICABILITY

As described above, the present invention provides a shock absorber capable of effectively absorbing impact or kinetic energy using the rupture stress of a wire while changing the direction of impact force from a horizontal direction into a vertical direction when being impacted. When either panel of the shock absorber is impacted, the tension wires of the shock absorber are expanded and ruptured by the impact or kinetic energy, thus effectively absorbing the impact energy and reducing the impact applied to the other panel. When being impacted, the shock absorber rarely generates reaction force, thus being almost free from causing secondary problems of bouncing. The shock absorber secures an effective displacement, so that it minimizes reaction force acting on an impacting material, thus reducing the damage of the impacting and impacted materials. This allows the shock absorber to effectively protect passengers when it is used with an automobile.

The above shock absorber is effectively used in a variety of industrial fields.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shock absorber, comprising:
   a plurality of unit cross members arranged in parallel, each said cross member including two arms hinged to be pivoted at every cross point;
   at least one tensile wire vertically linking upper and lower parts of said arms at a first and second sides of said cross point, said at least one tensile wire being connected to said unit cross members symmetrically and asymmetrically with respect to said cross point; and
   two guide panels vertically positioned on opposite sides of said cross members;
   whereby said shock absorber effectively absorbs impact or kinetic energy by using the rupture stress of said wire while changing the direction of impact from a horizontal direction into a vertical direction and by securing enough displacement between said two guide panels when being impacted.

2. The shock absorber according to claim 1, wherein said wire is produced by mixing several types of wires, having different lengths, materials, thickness and expansion coefficients.

3. The shock absorber according to claim 1, wherein said wire is made of a metal, synthetic resin, stainless steel or fiber.

4. The shock absorber according to claim 1, wherein said arms individually have a linear or curved configuration.

5. The shock absorber according to claim 1, wherein said arms are individually provided with a hole, a groove or a projection for holding the wire.

6. A shock absorber comprising:
   a plurality of unit cross members arranged in parallel, each said cross member including two arms hinged to be pivoted at every cross point;
   at least one elastic wire vertically linking upper and lower parts of said arms at a first side and a second side of said cross point, said elastic wire being connected to said unit cross members symmetrically and asymmetrically with respect to said cross point; and
   at least two guide panels vertically positioned on opposite sides of said cross members;
   whereby said shock absorber effectively absorbs impact or kinetic energy by using the rupture stress of said wire while changing the direction of impact from a horizontal direction into a vertical direction and by securing enough displacement between said guide panels when being impacted.

7. A shock absorber, comprising:
   at least one unit cross member including two longitudinal arms crossing each other and hinged to each other at a cross, thus being selectively closed by impact, and at least one wire vertically connected to said two crossing arms; and
   two guide panels vertically positioned on opposite sides of said cross member, said guide panels individually having a vertical guide groove on their inside surfaces, thus movably receiving associated ends of said arms along said guide groove,
   whereby said unit cross member absorbs kinetic energy and secures an effective displacement between said two guide panels when either of said two guide panels is impacted.

* * * * *